(12) United States Patent
Chung et al.

(10) Patent No.: US 10,089,806 B2
(45) Date of Patent: *Oct. 2, 2018

(54) DEVICE AND SYSTEM FOR CONTROLLING SECURE KEY ACCESS USING AN INTERNET-CONNECTED KEY BOX DEVICE

(71) Applicants: Yuan-Chou Chung, Bellevue, WA (US); Chiu-Wan Li, ChiaYi (TW)

(72) Inventors: Yuan-Chou Chung, Bellevue, WA (US); Chiu-Wan Li, ChiaYi (TW)

( * ) Notice: Subject to any disclaimer, the term of this patent is extended or adjusted under 35 U.S.C. 154(b) by 0 days.

This patent is subject to a terminal disclaimer.

(21) Appl. No.: 15/252,103

(22) Filed: Aug. 30, 2016

(65) Prior Publication Data

US 2017/0256111 A1  Sep. 7, 2017

Related U.S. Application Data

(63) Continuation-in-part of application No. 15/062,026, filed on Mar. 4, 2016, now Pat. No. 9,526,010.

(51) Int. Cl.
| | |
|---|---|
| *G05B 19/00* | (2006.01) |
| *G07C 9/00* | (2006.01) |
| *H04W 12/08* | (2009.01) |
| *H04W 88/02* | (2009.01) |

(52) U.S. Cl.
CPC ..... *G07C 9/00309* (2013.01); *G07C 9/00134* (2013.01); *G07C 9/00896* (2013.01); *H04W 12/08* (2013.01); *G07C 9/00571* (2013.01); *G07C 2009/00396* (2013.01); *G07C 2009/00769* (2013.01); *G07C 2009/00793* (2013.01); *G07C 2009/00936* (2013.01); *H04W 88/02* (2013.01)

(58) Field of Classification Search
CPC .................................................. G07C 9/00309
USPC .......................................................... 340/5.61
See application file for complete search history.

(56) References Cited

U.S. PATENT DOCUMENTS

| | | | | |
|---|---|---|---|---|
| 6,072,402 A | * | 6/2000 | Kniffin | G07C 9/00023 340/12.5 |
| 8,138,886 B1 | * | 3/2012 | Chang | E05B 19/0005 340/5.22 |
| 9,563,783 B2 | * | 2/2017 | Szebeni | G06F 21/6272 |
| 2007/0290797 A1 | * | 12/2007 | Harkins | G07C 9/00103 340/5.73 |
| 2007/0290799 A1 | * | 12/2007 | Harkins | G07C 9/00103 340/5.73 |
| 2009/0167488 A1 | * | 7/2009 | Hays | G07C 9/00309 340/5.5 |
| 2013/0117176 A1 | * | 5/2013 | Oler | B65D 50/00 705/39 |
| 2016/0180621 A1 | * | 6/2016 | Desinor, Jr. | G07C 9/00309 340/5.61 |

(Continued)

*Primary Examiner* — Santiago Garcia
(74) *Attorney, Agent, or Firm* — James Bunts; Bold IP, PLLC

(57) ABSTRACT

A system for controlling key access using a phone and internet-connected key box device. The key box device hangs or mounts on a fixture and controls key access to visitors. Visitors may unlock a chamber in a key device for key access by calling the phone number on the key box device display and passing an authentication process during a scheduled time. The key box device owner may monitor and remotely control access to the key box and its key chamber via a software application on cloud computing services that interfaces with operations programmed into a circuit board in the key box device.

8 Claims, 11 Drawing Sheets

(56) References Cited

U.S. PATENT DOCUMENTS

2016/0319568 A1* 11/2016 Kristensen .......... E05B 19/0005
2016/0337856 A1* 11/2016 Chung ............... G07C 9/00896

* cited by examiner

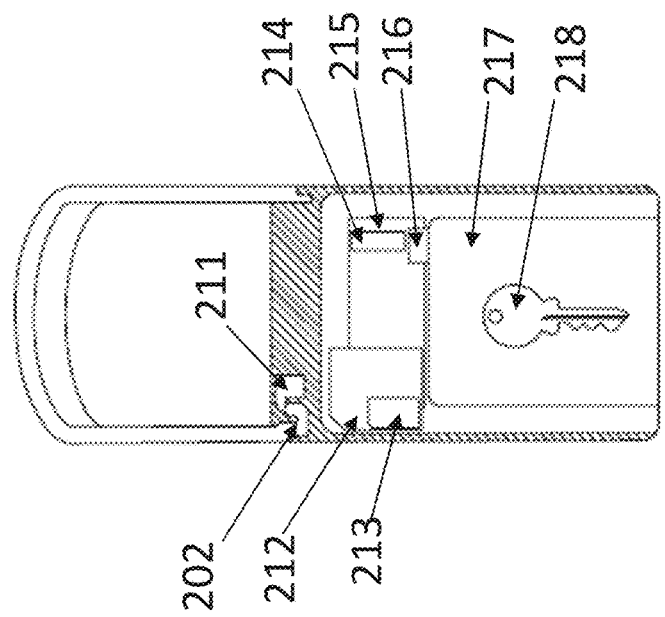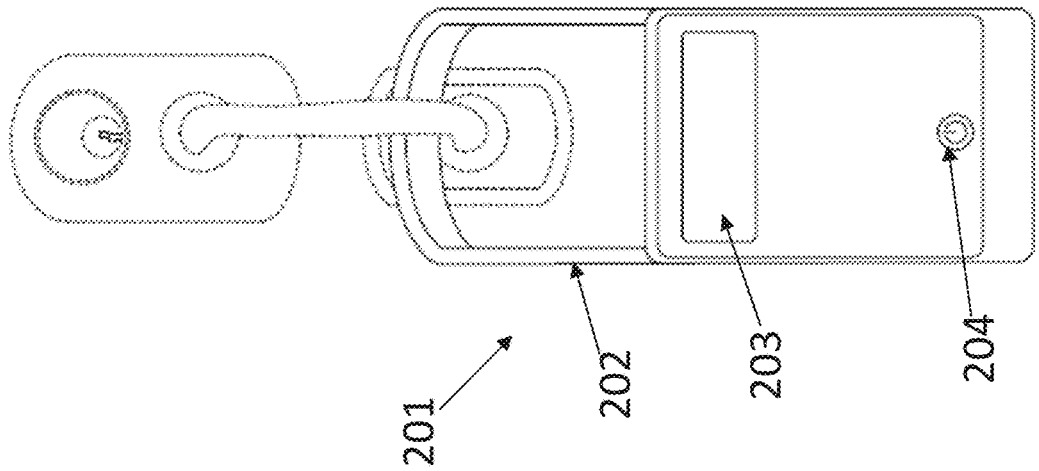

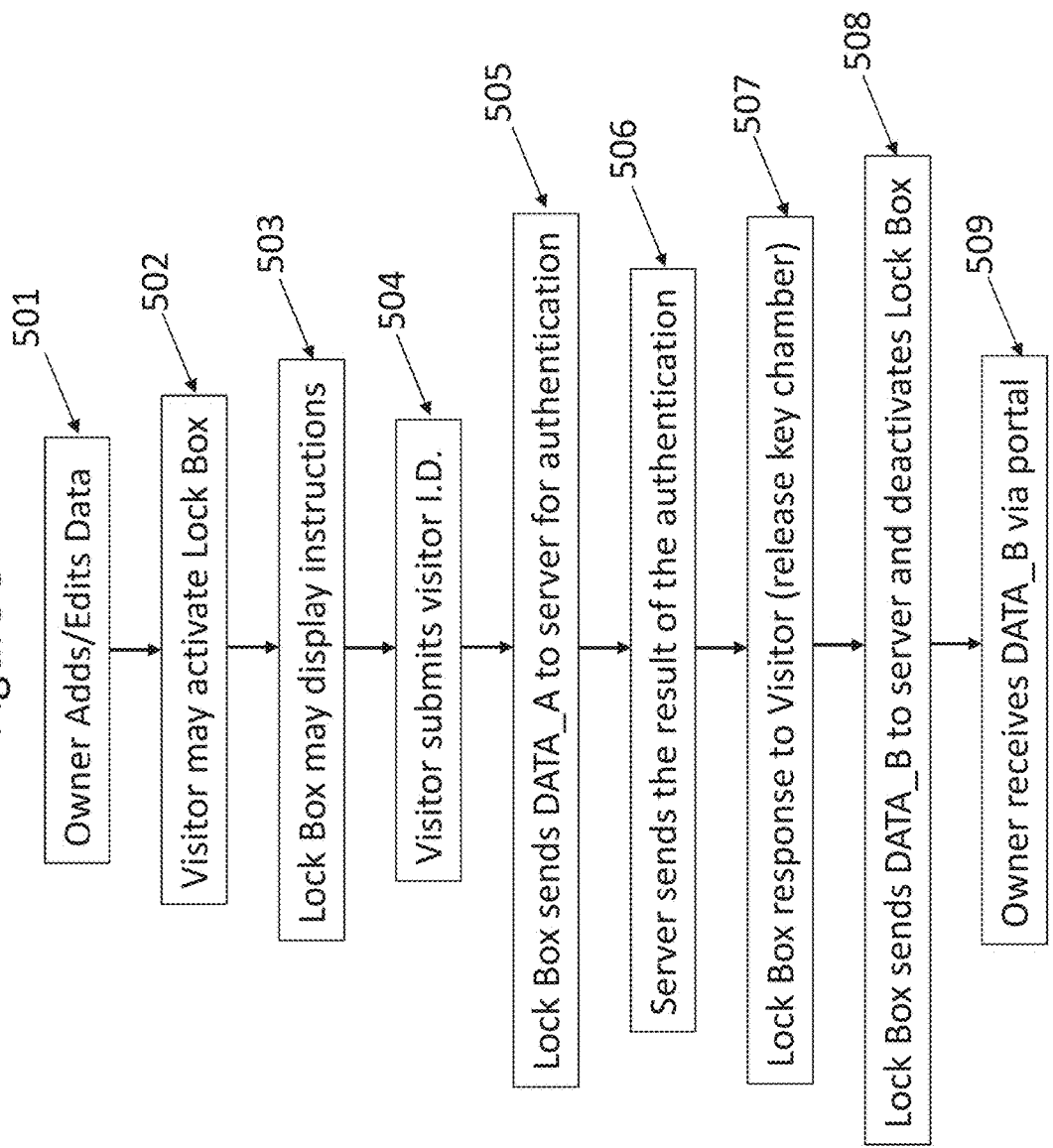

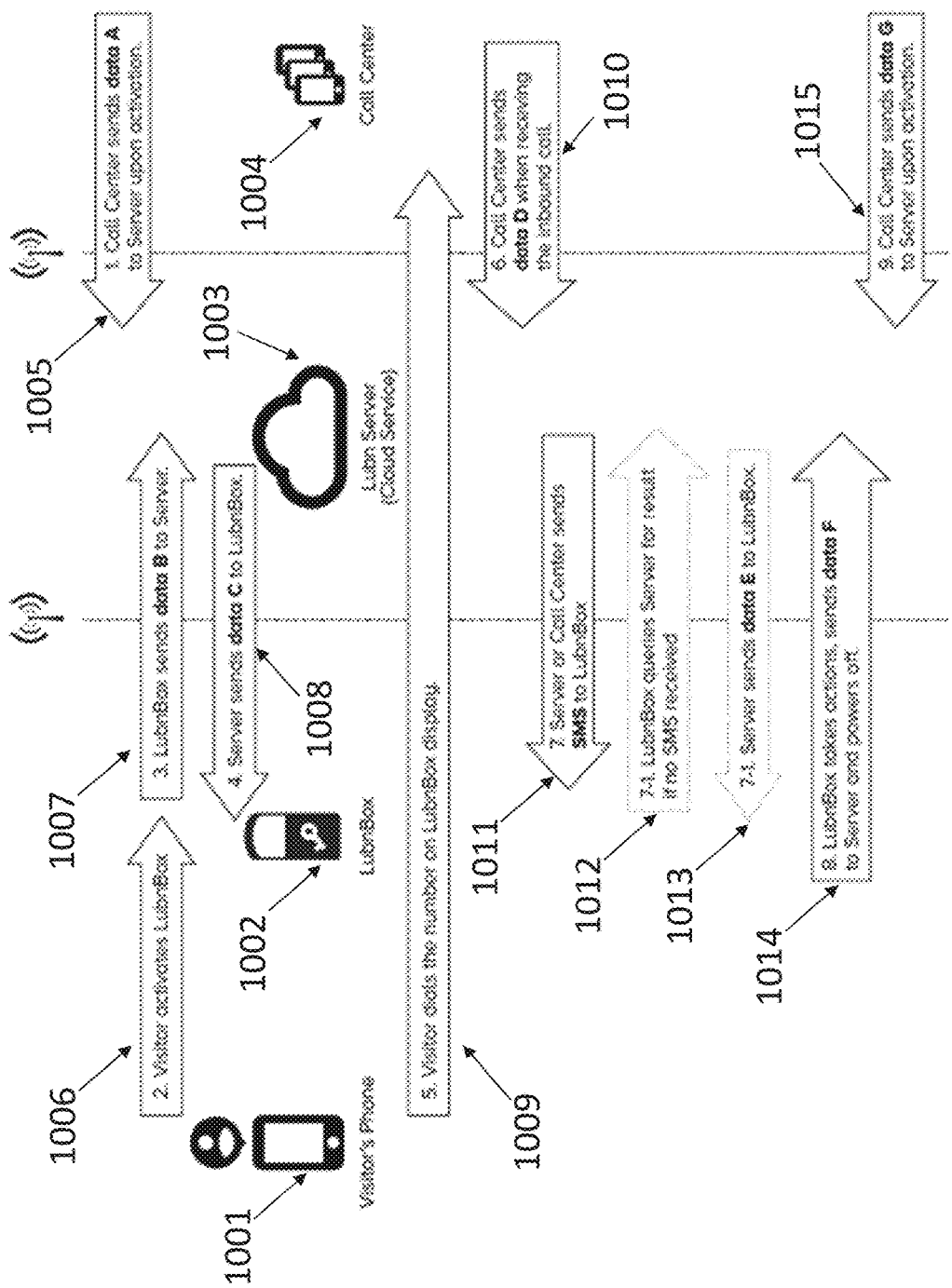

DEVICE AND SYSTEM FOR CONTROLLING SECURE KEY ACCESS USING AN INTERNET-CONNECTED KEY BOX DEVICE

CROSS-REFERENCE TO RELATED APPLICATIONS

The present application is a continuation in part application which claims the benefit of U.S. Nonprovisional patent application Ser. No. 15/062,026, filed on Mar. 4, 2016, entitled "System for Controlling Key Access Using an Internet-Connected Key Box Device," and U.S. Provisional Patent Application No. 62/161,448, filed on May 14, 2015, entitled "Internet Connected Key Box with Phone Signal Connection," which are incorporated herein by reference in their entirety as if fully set forth herein.

FIELD OF THE DISCLOSURE

This disclosure relates generally to the field of electronic lock and key devices and systems.

BACKGROUND

A property owner who is selling or renting a property without an agent on the market frequently must stay close to the property in order to complete the check-in and check-out process of accessing the property. Typically, access is gained by using a keyed door or gate. If the property owner cannot be near the property, the property owner may place the key in an insecure or hidden place, such as under the door mat or under a flower pot. The visitor may need to communicate with the property owner to locate the key. In addition, some visitors may forget to return the key when they check-out. Furthermore, owners may place the key in an analog key box and its pass-code may need to be memorized and changed periodically. In other cases, the owner may install a digital door lock which may permanently change the door configurations. In addition, many electronic key boxes require the visitors to install a software application on their mobile phone device or to hold a pre-delivered device, such as an RFID tag. Not all visitors can meet these requirements.

Many digital door locks controlled by internet applications accidentally open or close when no one is home. Some systems require a wireless internet connection for the digital door lock to function, and the digital door lock may be out of wireless internet connection range. Furthermore, if the property owner has a multi-family property, the above problems become even more cumbersome. Real-time human interaction can be unreliable and costly. An analog key box gives both the owner and the visitor several procedures to memorize and execute. Digital door locks require constant changing of the lock's configurations, and many require the visitor to install a software application.

For the foregoing reasons, a secure key access system is needed that is easy to use and allows for remote access to tenants or agents of the owner without having to coordinate with the owner to locate the key while maintaining a high level of security.

Accordingly, a secure key access system is disclosed, which includes an internet connected key box device, wherein the secure key access system controls access to the key remotely.

SUMMARY

The present invention relates to a system for controlling key access using an internet connected key box device comprising a chamber for holding a key device; a circuit board coupled to a locking mechanism configured to lock or release the chamber; an antenna coupled to the circuit board for receiving and transmitting wireless signals to trigger release of the chamber; a machine-to-machine (M2M) subscriber identity module (SIM) card coupled to the circuit board and antenna; the M2M SIM card comprising a unique identity; a call center comprised of a group of smartphones and/or circuit boards with wireless communication capability that can receive inbound calls via one or more phone numbers and connect to the internet, and the phone number accessed wirelessly by a user to access the key device in the chamber.

The disclosed invention comprises an internet-connected key box device that provides the owner the means to remotely manage "check-in" and "check-out" activities of a visitor in a unique way. A pre-approved visitor can access the key within the internet-connected key box device by calling the call center on a mobile phone device, with no other technology involved from the visitor's point of view.

The following embodiments and descriptions are for illustrative purposes only and are not intended to limit the scope of the System for Controlling Secure Key Access. Other aspects and advantages of the present disclosure will become apparent from the following detailed description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure. Also, the drawings included herein are considered by the applicant to be informal.

FIG. 2A is a front-view block diagram of one embodiment of the outside of the key box device.

FIG. 2B is a front-view block diagram of one embodiment of the internal components of the key box device

FIG. 5 is a flow diagram of one embodiment of a visitor check-in in the key access system.

FIG. 10 is a block diagram of one embodiment of the key access system with a call center.

FIG. 11C is a block diagram of one embodiment of the report on a user application of the key access system.

FIG. 11D is a block diagram of one embodiment of the timeline on a user application of the key access system.

Figure 1:
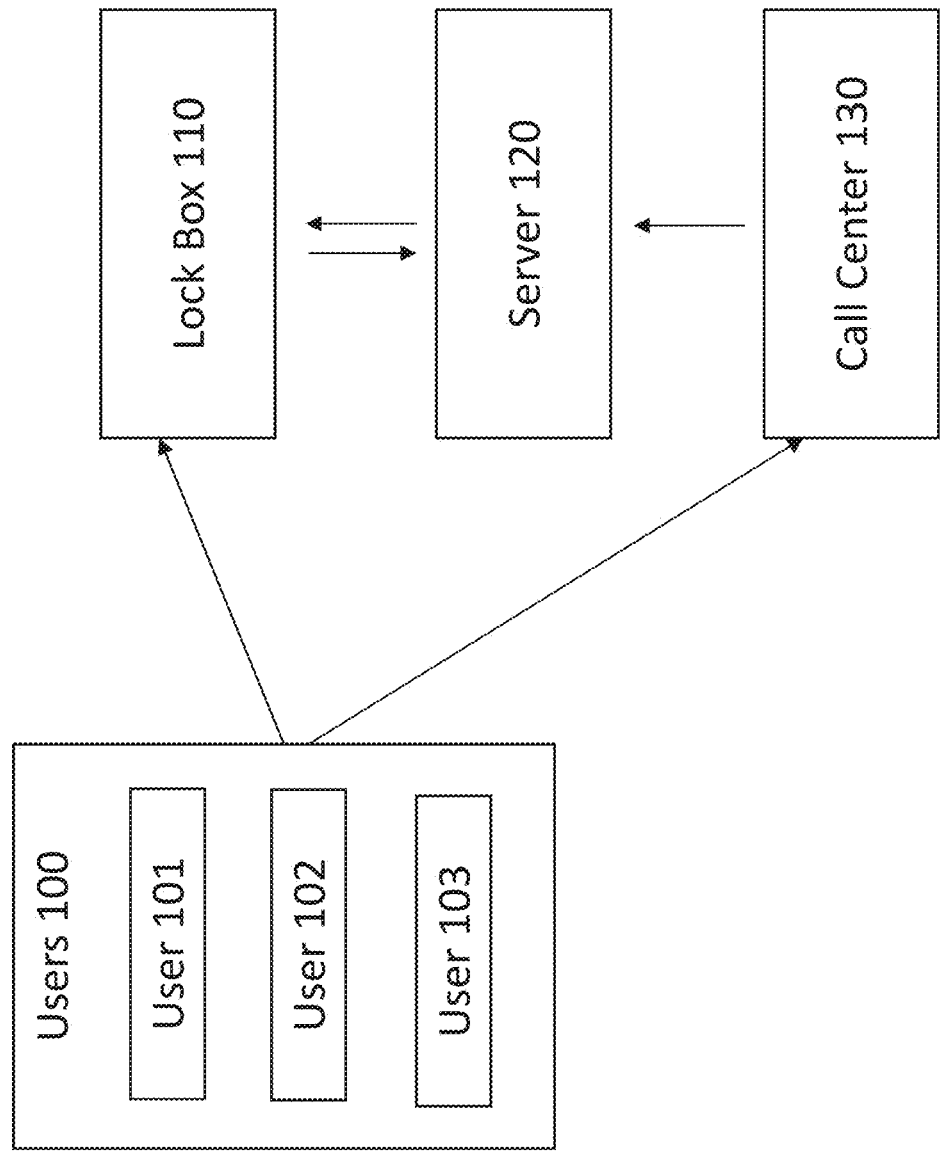
FIG. 1 is a block diagram of an overview of the key access system.

all arranged in accordance with at least some embodiments of the present disclosure.

DETAILED DESCRIPTION

In the Summary above and in this Detailed Description, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, among others, are optionally present. For example, an article "comprising" (or "which comprises") components A, B and C can consist of (i.e., contain only) components A, B and C, or can contain not only components A, B, and C but also contain one or more other components.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example, "at least 1" means 1 or more than 1. The term "at most" followed by a number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)—(a second number)," this means a range whose limit is the second number. For example, 25 to 100 mm means a range whose lower limit is 25 mm and upper limit is 100 mm.

Definitions

Authentication: a server task that runs an algorithm to authenticate a visitor by comparing data_A from an owner with the data_A from the visitor. When there is a match, the visitor is authenticated.

Automation: a server task that runs an algorithm to proactively respond to the conditions based on the owner's settings or system assumptions. Examples: (1) If the battery status is lower than 10%, the server may automatically report to the portal; (2) If the authentication continuously failed more than twice within a set timeframe, the server may automatically report to the portal. In this case, the system assumes the visitor is either needing assistance or the lock box is being sabotaged; (3) The check-out event is not realized in the scheduled check-out time/date, the server may automatically report to the portal. In this case, the system assumes the visitor may have forgotten the check-out time or forgotten to returned the chamber; (4) The check-out event is realized and a linked visitor is set by the owner, the server automatically reports to the portal which notifies the linked visitor. The server may bypass the portal to notify the linked visitor; (5) The check-out event is realized and linked devices, such as light bulbs are set by the owner, the server automatically reports to the portal which turns off the light bulbs. The server may bypass the portal to turn off the light bulbs.

Check-in: visitor is successfully authenticated and chamber is release or not from lock box.

Check-out: visitor inserts chamber back into lock box.

Commands: the request from server, portal, or host to ask a device to take actions or to change the status of a device.

Handling: an API (application program interface) on server hat receives incoming data and then passes to database and/or to the next server task.

Linked Devices: Devices linked to an event, such as a visitor's check-out event. For example, a digital door lock may be linked to a visitor's check-out event. As soon as the visitor checks-out, the system can command the digital door lock to lock the door Linked Visitor: A visitor identification is linked to an event, such as a visitor's check-out event. For example, a cleaning lady may be linked to a visitor's check-out event.

Portal: a user interface on a web browser or mobile application designed for the owner controlling key access.

Report: an API on server that sends data to portal or actions to lock box.

Short Message Service (SMS): a text messaging service component of phone, Web, or mobile communication systems. SMS holds the result of the verification or authentication and is pushed to the lock box from the server or from the call center after the server verifies or authenticates the inbound call number.

Timer: A set timeframe on the server. When the time is up, the server stops reporting actions to the lock box. The lock box must activate and establish a secure network connection within the set timeframe The present disclosure is generally drawn, inter alia, to systems therein relating to controlling secure key access. Aspects of the disclosed invention may be embodied as a system, method or process, or computer program product. Accordingly, aspects of the disclosed invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the disclosed invention may take the form of a computer program product embodied in one or more computer readable media having computer readable program code embodied thereon. In the preferred embodiments, a cloud computing system, a call center, and a lock box device communicate together to form a secure key access system that requires only a call from a visitor needing key access.

FIG. 1 is a block diagram of an overview of the key access system, arranged in accordance with at least some embodiments of the present disclosure. FIG. 1 includes a users 100, a user 101, a user 102, a user 103, a lock box 119, a server 120, and a call center 130. In FIG. 1, users 100 comprise user 101, user 102, and user 103. Any of the users may comprise a key owner, agent, visitors, service provider, law enforcement personnel, emergency personnel, and numerous other types of users. Lock box 110 is a device that users encounter to obtain onsite physical key access. The physical key may be to access a variety of locked structures, including but not limited to dwellings, buildings, garages, vehicles, recreational vehicles, sheds, equipment, and boats. Server 120 is a set of cloud servers with computing power to provide cloud computing services and a portal for an owner or agent managing key access to control and monitor key access. Call Center 130 is one or more smartphones, circuit boards, or a combination thereof with wireless communication capability that can provide available numbers, receive inbound calls and connect to the internet. Call center 130 may be operated by humans and robots and may be connected to artificial intelligence. Call center 130 may operate as a customer service center, such as to manage rental properties. The lock box would not hold the number that a visitor would call, the number is provided by the call center, which provides more security for the owner managing and controlling key access. In addition, the number may change over time for additional security.

In FIG. 1, call center 130 activates by sending SIM card information to Server 120. Users 100 interacts physically with lock box 110 and makes calls to call center 130. Lock box 110 and call center 130 send and receive information from server 120. Server 120 stores and processes data and also executes commands. Call center 130 sends data_A to server 120 as a result of a user call. Data_A is data for a scheduled event which may include: a lock box identification (SIM number in the lock box or set of unique numbers or combination thereof); lock box location; scheduled visitor identification (set by owner, can be mobile phone number, credit card number, passport identification, voice, visitor's smart device identification, etc.); linked visitor; permission level (access to lock box with or without time constraints or no permission to access); scheduled check-in and check-out time and date; and linked devices. Server 120 processes the data and sends a command to lock box 110, and lock box responds by acting on the command to provide or deny key access to a user.

FIG. 2A is a front-view block diagram of one embodiment of the outside of the key box device, arranged in accordance with at least some embodiments of the present disclosure. FIG. 2A includes a lock box 201, a hook 202, a display screen 203, and a power button 204. In FIG. 2A, the front panel of the lock box device serves the purpose of aesthetics and protection of the lock box device from the elements, such as rain and snow. The front panel may incorporate a solar panel to charge the lock box device. Hook 202 may be hooked onto a door knob, railing, or other fixture to secure lock box 201 to a secure, fixed location. Display screen 203 may display greetings, errors, and text messages explaining the next user action. Power button 204 may activate and inactivate lock box 201 by a person physically present and pressing on button 204. Power button 204 may additionally or alternatively comprise a motion sensor.

FIG. 2B is a front-view block diagram of one embodiment of the internal components of the key box device, arranged in accordance with at least some embodiments of the present disclosure. FIG. 2B includes a hook 202, a latch 211, a communication module 212, a subscriber identity module (SIM) card 213, an antenna 214, a circuit board 215, a key chamber latch 216, a key chamber 217, and a key 218. In FIG. 2B, When hook latch 211 is drawn back by a motor, a servo, or a solenoid, the weight of lock box 201 will cause lock box 201 to drop into position off the hook 202 pin. Then, hook 202 can be rotated against the hook pin so the lock box can be uninstalled from the attached surface or object. Alternatively to the hook system, lock box 201 may be mounted on a wall of a fixed location with a wall mount plate instead of hooking lock box 201 on a railing or a door handle.

Lock box 201 may be powered by primary and secondary batteries. The primary battery may be a rechargeable battery and cannot be replaced by a user. The secondary battery may be replaced by a user and functions to charge the primary battery. Thus, when the secondary battery runs out of power, the lock box device may continue to work. The lock box may additionally or alternatively be configured with a solar panel to charge the primary battery.

SIM card 213 may be inserted into communication module 212, which is connected to circuit board 215. Antenna 214 may be wire-connected or embedded in communication module 212 or circuit board 215.

Circuit board 215 comprises a microcontroller unit to store and run the needed programs on the software application. Circuit board 215 may be a printed circuit board (PCB). Circuit board 215 comprises the firmware component of the software application. In some embodiments, circuit board 215 may comprise a vibration sensor to prevent sabotage to the key box device.

In some examples, the lock box may comprise a servo control mechanism which controls key chamber latch 216 and a spring mechanism of sufficient tension to eject key chamber 217 substantially out of the key box device as soon as key chamber latch 216 is released. The servo may connect to a hinge and swing arm system which can operate key chamber latch 216 and hook latch 211. The hook may also release via a hook release button. Alternatively, two servos may control the latches separate, or other similar mechanism that can effectuate open and closed states. Other embodiments comprise a load cell and switch capable of measuring the weight of key chamber 217. Other embodiments comprise a rotation plate connected to hook 202 wherein circuit board 215 receives a message from the software application and commands the servo to rotate to release key chamber latch 216 to open key chamber 217. The rotation plate may also rotate in another direction to open hook latch 211.

In some examples, the lock box may comprise a one-time chamber pin wherein use of force to yank the keys out of the chamber would break the hole in the chamber designed to fix the chamber in the lock box device. The breaking of the hole in the chamber prevents the check-out process. The lock box would then send the system a notification of the lack of a check out once the checkout time has passed.

In some embodiments, lock box 201 may comprise multiple key chambers 217 or attached key chamber 217 modules. One embodiment of key chamber 217 is customization as a remote control that may not be dispensed. The solenoid may be configured to press the remote control if a user is authenticated.

In some examples, the lock box may comprise a camera to take photos and videos. Photos or videos taken at the moment of power-on and key access may add security for the owner monitoring and controlling key access. The lock box may also have a global positioning system (GPS) receiver to provide location information.

Figure 3:
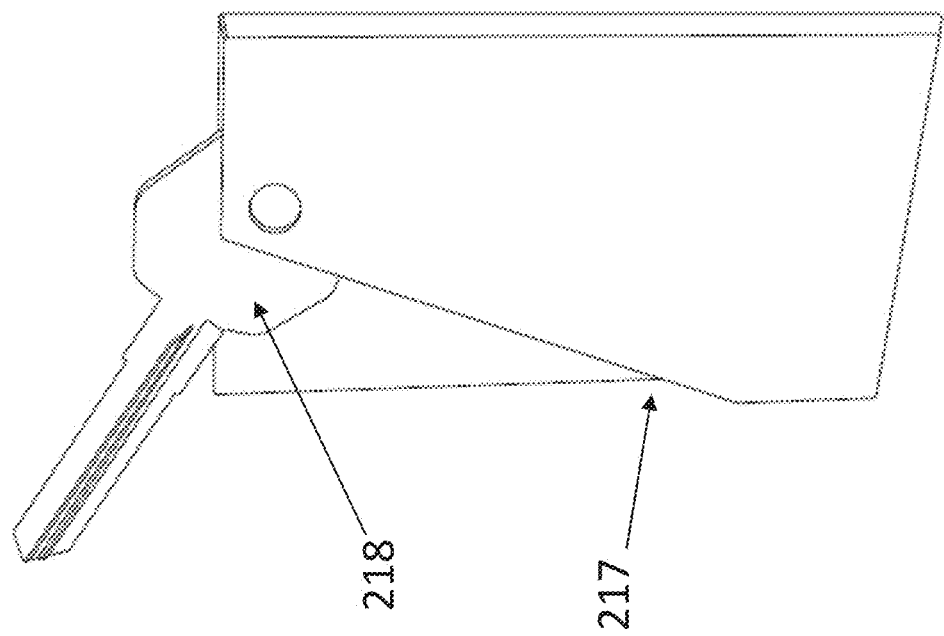
FIG. 3 is a front-view block diagram of one embodiment of the key and the key compartment of the key box device.

FIG. 3 is a front-view block diagram of one embodiment of the key and the key compartment of the key box device, arranged in accordance with at least some embodiments of the present disclosure. FIG. 3 includes a key chamber 217 and a key 218. In FIG. 3, key chamber 217 may be completely removed from the lock box device. Key chamber 217 may be configured with a certain width, length, and depth, to accommodate different types of keys. Key 218 is an example key fitting within the slot compartment of key chamber 217. Key 218 may be any device that can open a lock, door, gate, or means of access. Examples are a metal key, a magnetic-strip key card, a scannable bar code key, an RFID (radio-frequency identification) tag key device, a key fob device, an integrated circuit-chip card, and other similar devices commonly known in the art as "keys."

Figure 4:
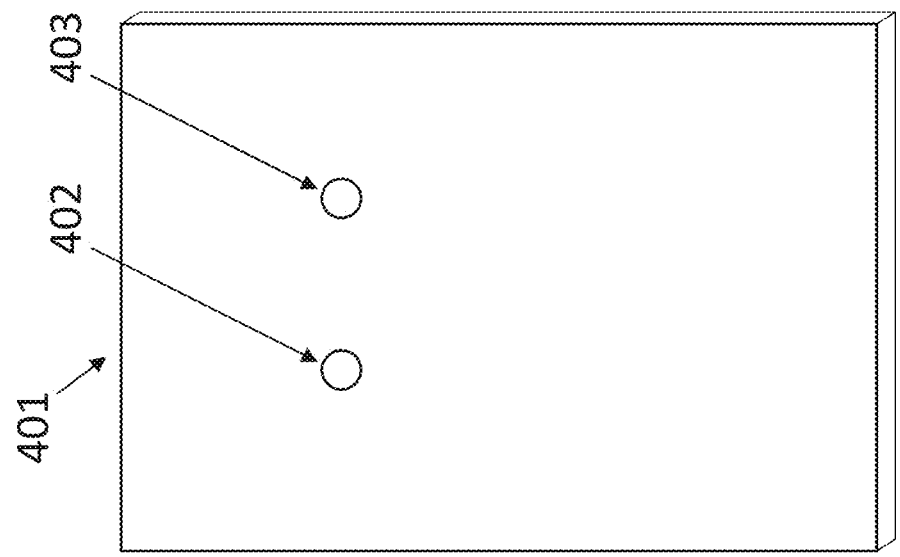
FIG. 4 is a front-view block diagram of one embodiment of the key of the key box device.

FIG. 4 is a front-view block diagram of one embodiment of the key of the key box device, arranged in accordance with at least some embodiments of the present disclosure. FIG. 4 includes a key 401, a button 402, and a button 403. In FIG. 4, key 401 is an embodiment of a remote control key device that may be programmed to open and control a means of access, such as a garage door. Button 402 and button 403 may be pressed by a user to pair key 401 to a particular garage door and subsequently to open and close the paired door.

FIG. 5 is a flow diagram of one embodiment of a visitor check-in in the key access system, arranged in accordance with at least some embodiments of the present disclosure. FIG. 5 includes a step 501, a step 502, a step 503, a step 504, a step 505, a step 506, a step 507, a step 508, and a step 509.

In FIG. 5, a flow diagram outlining the steps of a visitor check-in in the key access system is displayed. In step 501, an owner or agent controlling key access logs in to the portal and adds data_A to the server via the portal. Data_A is data for a scheduled event which may include: a lock box identification (SIM number in the lock box or set of unique numbers or combination thereof); lock box location; scheduled visitor identification (set by owner, can be mobile phone number, credit card number, passport identification, voice, visitor's smart device identification, etc.); linked visitor; permission level (access to lock box with or without time constraints or no permission to access); scheduled check-in and check-out time and date; and linked devices. In step 502, a visitor wanting key access may activate the lock box. The lock box may be activated by depressing a button, vibration (accelerometer), touch (via a capacitive sensor), and motion sensor. When the lock box is activated, it may establish a secure network connection to the server and may display instructions to the visitor in step 503. The lock box may establish a secure network connection to the server including but not limited to 2G, 3G, 4G, 5G, 6G, intranet, and internet. The instructions displayed on the lock box may include text explaining the next user action, error messages, and greetings.

In step 504, in response to an instruction, the visitor submits visitor identification to the lockbox by calling the number displayed on the lock box. The number maybe a unique number for each lock box or may be a number assigned by a call center. In step 505, the lock box sends data_A to the server for authentication. In step 506, the server authenticates the data and sends the result to the lock box. The server starts authentication by checking data_A submitted by the owner or agent and data_A submitted by the visitor. A match between the two sets of data A means authentication. No match between the two sets of data A mean no authentication. In step 507, the lock box responds to the authentication result. The response may include release of the chamber which stores the key to the visitor, release the lock box hook, and display a message or instruction.

In step 508, the lock box sends data_B to the server and deactivates the lock box to conserve power. Data_B is data for a realized event, which may include: data_A information; actual check-in and check-out time and date; lock box power status; lock box battery status; lock box chamber status; lock box hook status; and authentication result. The server receives data_B and updates the portal. In step 509, the owner or agent receives data_B via the portal. The portal may display visualized data_B, such as the visitor's check-in history. If linked visitors or linked devices were previously specified by the owner or agent in data_A, automation will be started.

Automation is a server task that runs an algorithm to proactively respond to the conditions based on the owner's settings or system assumptions. Examples: (1) If the battery status is lower than 10%, the server may automatically report to the portal; (2) If the authentication continuously failed more than twice within a set timeframe, the server may automatically report to the portal. In this case, the system assumes the visitor is either needing assistance or the lock box is being sabotaged; (3) The check-out event is not realized in the scheduled check-out time/date, the server may automatically report to the portal. In this case, the system assumes the visitor may have forgotten the check-out time or forgotten to returned the chamber; (4) The check-out event is realized and a linked visitor is set by the owner, the server automatically reports to the portal which notifies the linked visitor. The server may bypass the portal to notify the linked visitor; (5) The check-out event is realized and linked devices, such as light bulbs are set by the owner, the server automatically reports to the portal which turns off the light bulbs. The server may bypass the portal to turn off the light bulbs.

Figure 6:
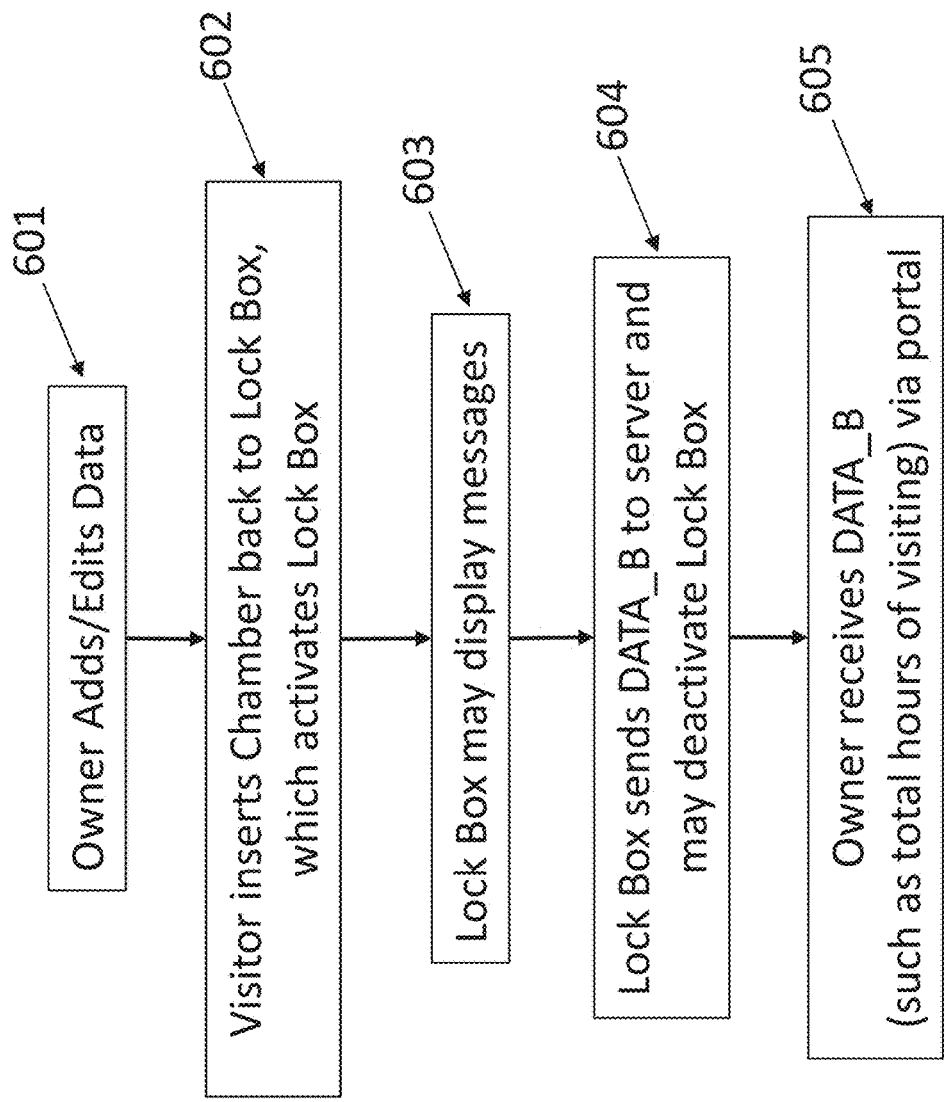
FIG. 6 is a flow diagram of one embodiment of a visitor check-out in the key access system.

FIG. 6 is a flow diagram of one embodiment of a visitor check-out in the key access system, arranged in accordance with at least some embodiments of the present disclosure. FIG. 6 includes a step 601, a step 602, a step 603, a step 604, and a step 605.

In FIG. 6, a flow diagram outlining the steps of a visitor check-out in the key access system is displayed. In step 601, an owner or agent controlling key access adds or edits data_A via the portal. Data_A may be added or edited because a visitor request to stay longer while staying on the property or has updated his or her phone number while staying on the property. Additionally, if a visitor requests to check-out earlier while staying on the property, the owner or agent controlling key access may edit the check-in time of another visitor. Furthermore, the visitor may forget to return the key chamber to the lock box device after the permitted time even if the system reminds the visitor. The owner or agent controlling key access may have to manually check-out the guest because the key chamber will be returned at a later time than scheduled or anticipated. In this case, the owner or agent controlling key access would modify data_B via the portal. The visitor may still return the key chamber back to the lock box device and retrieve the key chamber with the same method anytime during the permitted hours, similarly to asking a hotel front desk to hold your room keys when we need to leave the hotel for a while. In step 602, a visitor who had key access inserts the key chamber back into the lock box. The insertion of the key chamber activates the lock box. In step 603, the lock box may display messages to the visitor while the lock box is establishing secure network connection and sending data_B to the server. In step 604, the lock box sends data_B to the server and may deactivate the lock box. The server receives data_B and updates the portal. In step 605, the owner or agent receives data_B via the portal. The portal may display visualized data_B, such as total length of time of visiting. If linked visitor or linked devices were previously specified by the owner or agent in data_A, automation will be started.

Figure 7:
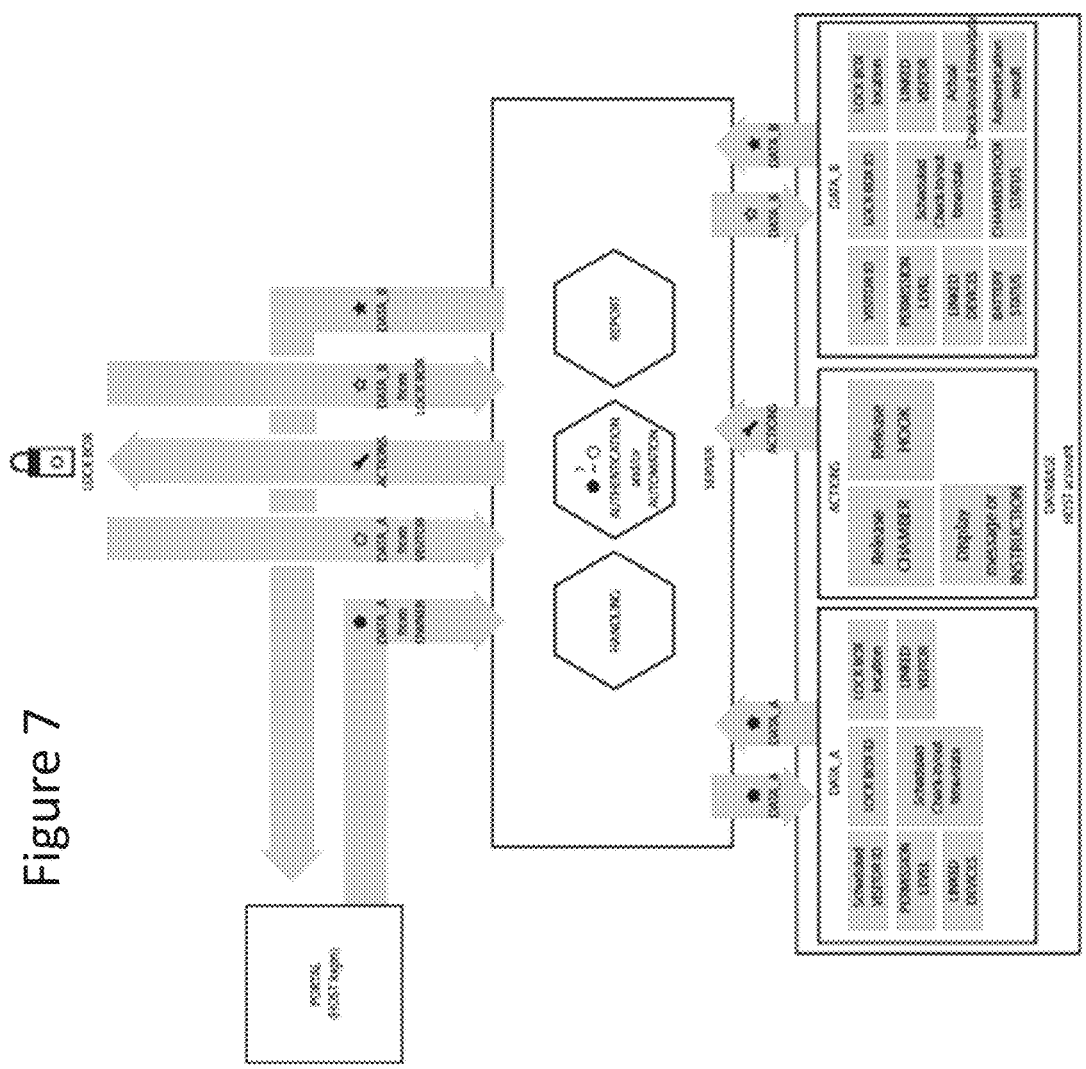
FIG. 7 is a block diagram of one embodiment of a visitor check-in/out on the server of the key access system.

FIG. 7 is a block diagram of one embodiment of a visitor check-in/out on the server of the key access system, arranged in accordance with at least some embodiments of the present disclosure.

In FIG. 7, a block diagram outlining the interactions of a visitor check-in and check-out on the server of the key access system is displayed. Portal sends data_A to server. Server takes data_A through handling and stores data_A at database in host's account. When server receives data A from visitor, server retrieves data A from database and kicks off authentication. After authentication, server reports actions to lock box according to the result of authentication. Later, lock box sends data B to server and server stores data B in database. Server reports summarized data_B to portal for data visualization.

Figure 8:
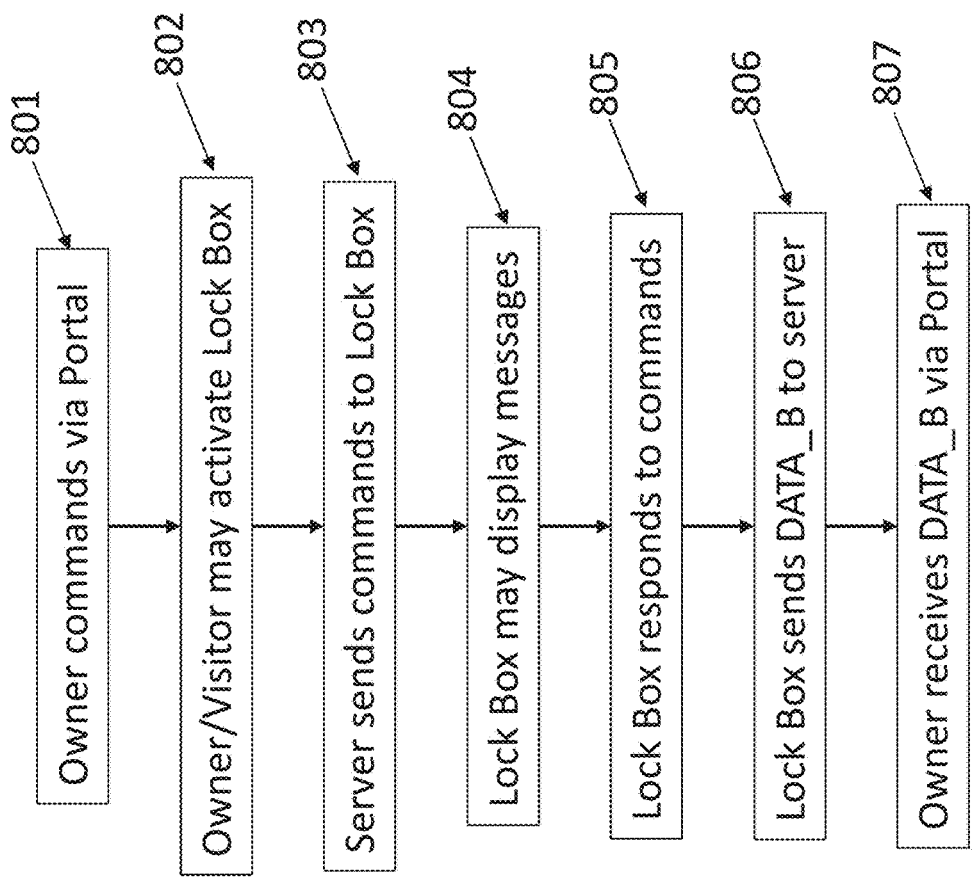
FIG. 8 is a flow diagram of one embodiment of an owner remote command in the key access system.

FIG. 8 is a flow diagram of one embodiment of an owner remote command in the key access system, arranged in accordance with at least some embodiments of the present disclosure. FIG. 8 includes a step 801, a step 802, a step 803, a step 804, a step 805, a step 806, and a step 807.

In FIG. 8, a flow diagram outlining the steps of an owner or agent remotely commanding the key access system is displayed. In step 801, the owner or agent enters commands via the portal. Commands to the lock box includes release hook, release chamber, or release both hook and chamber. The portal may show the timer, which is the timeframe in which the server will report actions or commands to the lock box. In step 802, the owner or agent or visitor may activate the lock box. In step 803, the server sends commands to the lock box as soon as the lock box establishes a secure network connection and before the timer runs out (within the timeframe set by the owner or agent). In step 804, the lock box may display messages. In step 805, the lock box responds to commands according to the owner or agent's request via the portal. In step 806, the lock box sends data_B to the server and deactivates the lock box. In step 807, the owner or agent receives data_B via the portal.

Figure 9:
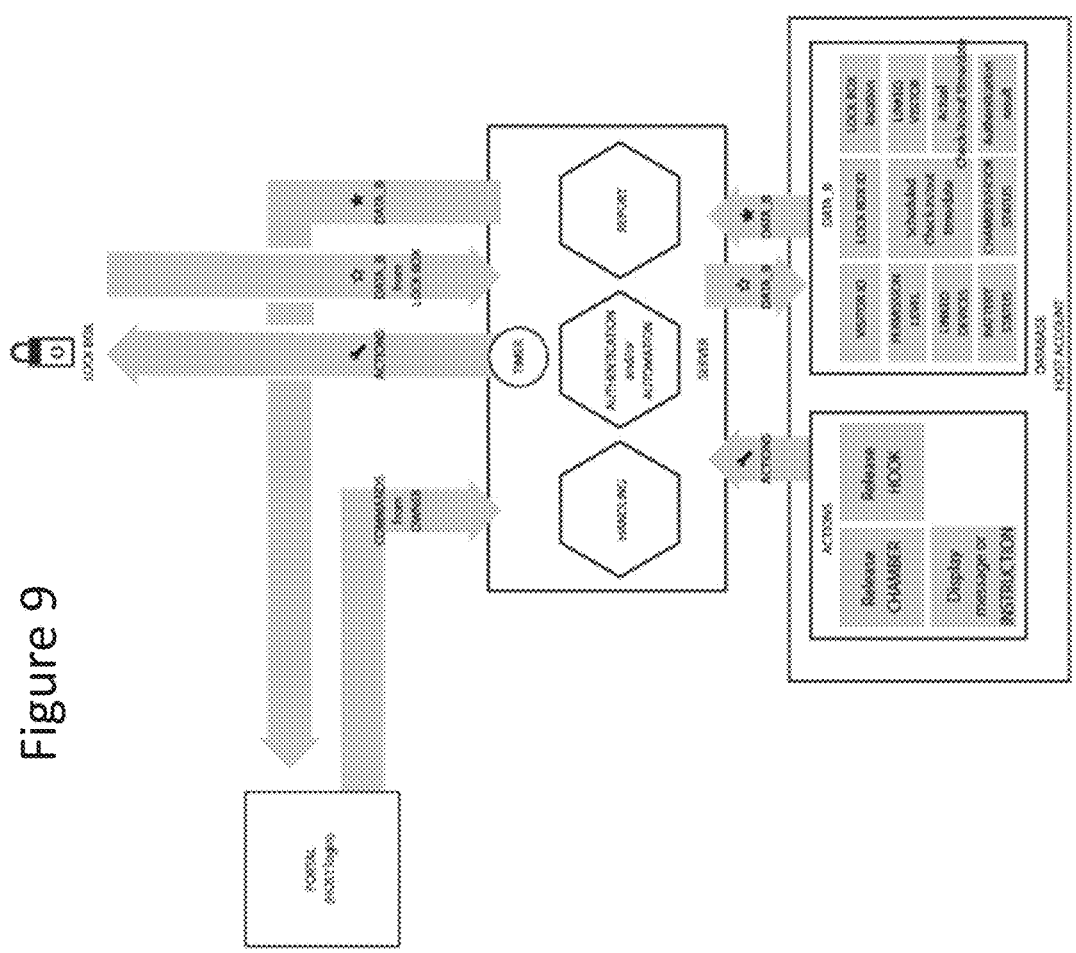
FIG. 9 is a block diagram of one embodiment of an owner remote command on the server in the key access system.

FIG. 9 is a block diagram of one embodiment of an owner remote command on the server in the key access system, arranged in accordance with at least some embodiments of the present disclosure. In FIG. 9, block diagram outlining the interactions of an owner remote command on the server of the key access system is displayed. Portal sends commands from owner to server. Server sends the actions from database according to the commands from owner to lock box and starts timer. Server keeps sending actions to lock box until lock box is activated and connected with server or until timeout. If lock box successfully receives actions, lock box sends data_B to server and data_B is saved in database. Server then stops the timer and stops sending actions. Server then sends summarized data_B to portal.

FIG. 10 is a block diagram of one embodiment of the key access system with a call center, arranged in accordance with at least some embodiments of the present disclosure. FIG. 10 includes a visitor's phone 1001, a lock box 1002, a server 1003, a call center 1004, a step 1005, a step 1006, a step 1007, a step 1008, a step 1009, a step 1010, a step 1011, a step 1012, a step 1013, a step 1014, and a step 1015.

In FIG. 10, a block diagram of one embodiment of the key access system with a call center is displayed. Visitor's phone 1001, lock box 1002, server 1003, and call center 1004 interact as party of the key access system. Lock box 1002 interacts with server 1003 over a secure internet connection. Server 1003 also interacts with call center 1004 over a secure internet connection. In step 1005, call center 1004 sends data A to server 1003 upon activation of call center 1004 by an administrator. Data_A is the activated SIM card identity, such as ICCID (unique serial number) or IMSI (international mobile subscriber identity). Server 1003 may be configured to comprise a data table to pair ICCID or IMSI and the visitor's phone number. This is why when the Call Center sends the ICCID to the server, the server knows which number is currently available for visitors to dial. In step 1006, a visitor activates lock box 1002. In step 1007, lock box 1002 sends data B to server 1003. Data B is data A with other lock box 1002 information, such as battery status and device location. In step 1008, server 1003 sends data_C to lock box 1002. Data_C is the dialing information from server 1003 for verifying visitors. In step 1009, visitor's phone 1001 calls call center 1004 by dialing the number on the display of lock box 1002. In step 1010, call center 1004 sends data_D to server 1003 when receiving the inbound call. Data D is the received inbound call number. In step 1011, server 1003 send a short message service (SMS) to lock box 1002. The SMS can be sent by server 1003 or by call center 1004 devices after they are noticed by server 1003. In step 1012, lock box 1002 queries server 1003 for a result if no SMS is received. In step 1013, server 1003 sends data_E to lock box 1002. Data_E is the result of the verification or authentication. In step 1014, lock box 1002 carries out the server 1003 commands, sends data_F to server 1003, and powers off. Data_F includes but is not limited to lock box 1002 power off status, battery status, location, and key status. In step 1015, call center 1004 sends data_G to server 1003 upon deactivation. Data_G is the deactivated SIM card identity, such as ICCID or IMSI.

Figure 11B:
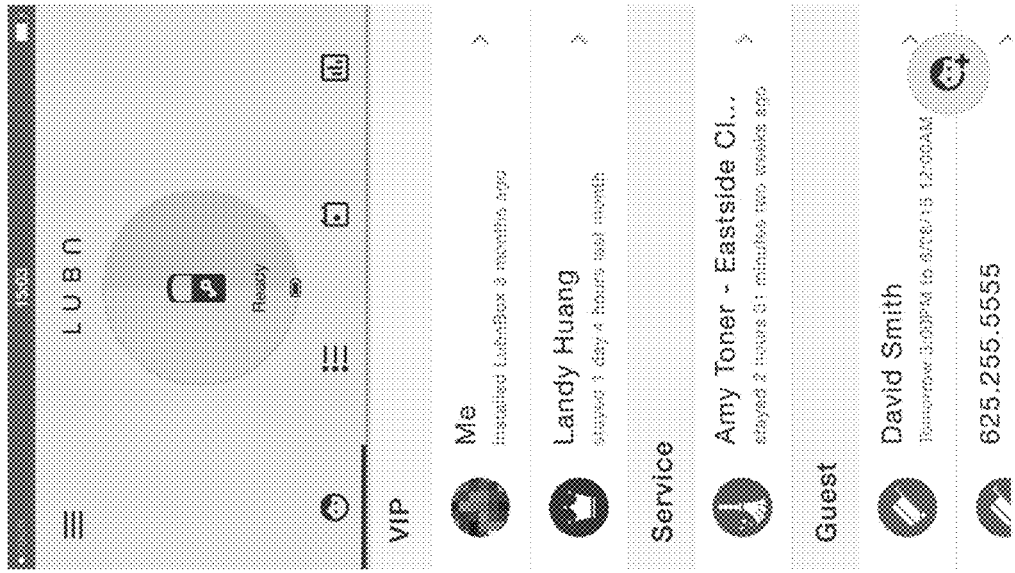
FIG. 11B is a block diagram of one embodiment of the guestbook on a user application of the key access system.
Figure 11A:
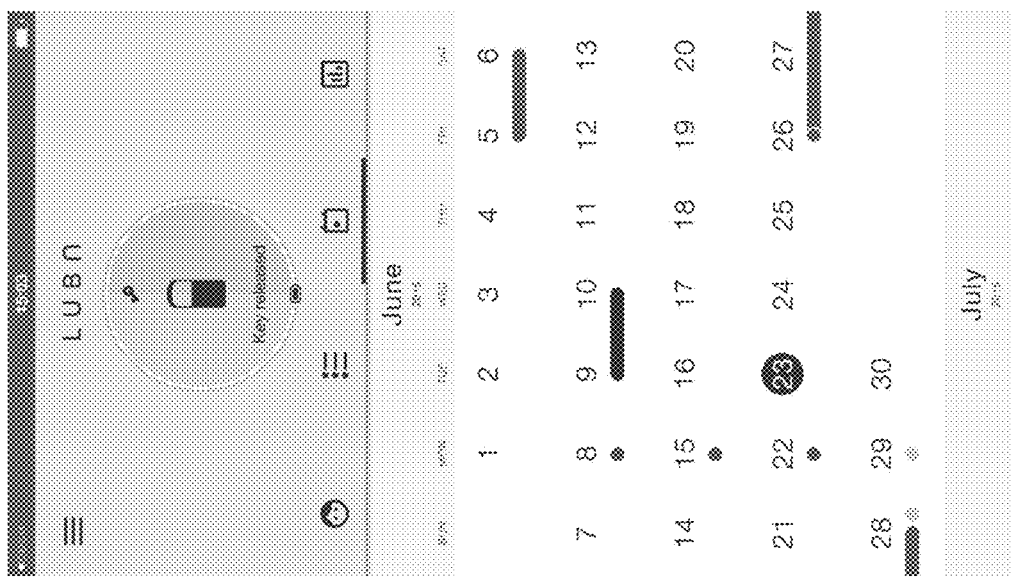
FIG. 11A is a block diagram of one embodiment of the calendar on a user application of the key access system.

FIG. 11A is a block diagram of one embodiment of the calendar on a user application of the key access system, arranged in accordance with at least some embodiments of the present disclosure. In FIG. 11A, an embodiment of an application screen for a calendar month is displayed. The calendar may display indications of when users are scheduled to access a key in a lock box. The calendar may also be color coded to indicate certain details, such as scheduled access, guess access, and services access.

FIG. 11B is a block diagram of one embodiment of the guestbook on a user application of the key access system, arranged in accordance with at least some embodiments of the present disclosure. In FIG. 11B, an embodiment of an application screen for a guestbook is displayed. Listings within the guestbook may include names and contact information of those who have been granted access and the actual time and duration of such access.

FIG. 11C is a block diagram of one embodiment of the report on a user application of the key access system, arranged in accordance with at least some embodiments of the present disclosure. In FIG. 11C, the details and statistics of key access may be displayed. Details may include date, time, and duration of access. Additional details may include who gained access or categories of people who gained access. Such details and statistics may be useful to track and gauge services provided, such as housekeeping, and foot traffic of potential buyers of a certain listing.

FIG. 11D is a block diagram of one embodiment of the timeline on a user application of the key access system, arranged in accordance with at least some embodiments of the present disclosure. In FIG. 11D, an embodiment of an application screen for listing scheduled events for key access to a lock box is displayed. The screen may display details comprising date, time, visitor identification, and other useful information for managing the lock box and key access.

While preferred and alternate embodiments have been illustrated and described, as noted above, many changes can be made without departing from the spirit and scope of the system for controlling secure key access. Accordingly, the scope of the system for controlling secure key access is not limited by the disclosure of these preferred and alternate embodiments. Instead, the scope of the system for controlling secure key access should be determined entirely by reference to the claims. Insofar as the description above and the accompanying drawings (if any) disclose any additional subject matter that is not within the scope of the claims below, the inventions are not dedicated to the public and Applicant hereby reserves the right to file one or more applications to claim such additional inventions.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example of a generic series of equivalent or similar features.

Any element in a claim that does not explicitly state "means for" performing a specified function, or "step for" performing a specific function is not to be interpreted as a "means" or "step" clause as specified in 35. U.S.C. § 112 ¶6. In particular, the use of "step of" in the claims herein is not intended to invoke the provisions of U.S.C. § 112 ¶6.

What is claimed is:

1. A system for remotely controlling and monitoring key access, comprising:
    a locked structure or locked vehicle having a flat surface on which to mount a key box device or at least one fixture on which the key box device may be placed;
    a lock, wherein the lock is located on the locked structure or the vehicle, and wherein the lock is configured to be opened by a physical key;
    a visitor needing the key access to the lock, wherein the visitor has at least an identifying phone number;
    an owner or agent controlling and monitoring the key access;
    a call center that takes inbound calls;
    a key box device, further comprising:
        a display that is configured to show text messages;
        a removable chamber for holding the physical key, wherein the physical key is to be placed in the removeable chamber;
        a locking mechanism located on the key box device configured to lock or release the removeable chamber;
        a cloud computing software application that enables wireless communication;
        a circuit board coupled to the cloud computing software application;
        an antenna for receiving and transmitting wireless signals;
        a subscriber identity module (SIM) card; and
        a power source; and
    a granting of the key access when at least the following steps are performed:
        the identifying visitor's phone number, anticipated check-in time, and anticipated check-out time are registered into the cloud computing software application;
        the key box device is activated at about the anticipated check-in time;
        the key box device displays a number for the visitor to call;
        the visitor calls the displayed number on a registered mobile communication device;
        the cloud computing software application verifies the incoming call number matches the phone number on the registered mobile communication device;
        the cloud computing software application commands the key box device to release the physical key located in the removeable chamber; and
        the key box device releases the physical key located in the removeable chamber.

2. The system of claim 1, wherein the key box device further comprises a global positioning system receiver.

3. The system of claim 1, wherein the key box device further comprises a G-Force sensor or an accelerometer for sensing external forces.

4. The system of claim 1, wherein the key box device comprises an electronic opener.

5. The system of claim 1, wherein the key box device does not release the removeable chamber and the removeable chamber comprises an electronic opener that grants access when authentication of the visitor is verified.

6. The system of claim 1, wherein the key box device further comprises a camera to take photos and video, such as at the moment the key box device is activated and when the physical key located in the removeable chamber is removed or returned.

7. The system of claim 1, wherein the key box device may be completely controlled remotely via the cloud computing software application.

8. A non-transitory computer readable storage medium having computer executable instructions executable by a processor, the instructions that, when executed by the processor, cause the processor to:
    receive and store data entered by an owner or agent controlling key access to a lock box, the lock box further comprising:
        a display that is configured to show text messages;
        a removable chamber for holding a physical key, wherein the physical key is to be placed in the removeable chamber;
        a locking mechanism located on the lock box configured to lock or release the removeable chamber;
        a cloud computing software application that enables wireless communication;
        a circuit board coupled to the cloud computing software application;
        an antenna for receiving and transmitting wireless signals;
        a subscriber identity module (SIM) card; and
        a power source;
    power-on the lock box;
    receive and store data from the lock box activated by a visitor;
    send dialing information to the lock box;
    display a message on the display of the lock box;
    receive and store the data from the visitor's call to the call center;
    compare the data entered by the owner or agent for a match with data from the visitor's call;
    send a command to the lock box based on the result of the data comparison;
    execute the command on the lock box, further comprising, authorizing the removal of the removeable chamber from the lock box and releasing the physical key from the removeable chamber;
    receive and store additional data from the lock box;
    power-off the lock box; and
    receive and store additional data from the call center upon deactivation.

* * * * *